United States Patent Office 2,857,259
Patented Oct. 21, 1958

2,857,259

PRE-EMERGENT HERBICIDE

William E. Weesner, Dayton, Ohio, and Philip C. Hamm, Webster Groves, Mo.

No Drawing. Application December 9, 1955
Serial No. 552,000

4 Claims. (Cl. 71—2.3)

The present invention relates to herbicidal compositions and more particularly provides certain new and valuable pre-emergent herbicidal compositions possessing selective activity, and methods of preventing the growth of undesired plant life in which such compositions are used.

I have found that improved, very efficient herbicidal compositions are obtained when they are prepared in oil-in-water emulsions of formaldehyde, 2,4-dinitrophenylhydrazone.

Herbicidal compositions containing the present hydrazone are readily prepared by first preparing a solution of the hydrazone in an organic solvent and then adding the resulting solution to water and forming an emulsion by the use of an emulsifying agent. Because of the very high herbicidal efficiency of the hydrazone, it is present in the herbicidal composition in only very small concentrations, for example, in concentrations of from 0.1 percent to 2.0 percent by weight of the total weight of the emulsion. Emulsifying agents which may be employed are those customarily used in the art for the preparation of oil-in-water emulsions. The word "oil" is here used to designate any organic liquid which is insoluble in water. Since the present hydrazone is a highly stable compound of little chemical reactivity, it is not affected by either ionic or nonionic emulsifying agents. Examples of emulsifying agents which may be used include long-chain alkylbenzenesulfonates, polyalkylene glycols, alkyl-substituted succinates, etc. Depending upon the concentration of the formaldehyde 2,4-dinitrophenylhydrazone in the emulsion, the emulsion may be used to prevent the growth of any plants in media which normally support plant growth, or they may be used to prevent the growth of certain plants while permitting normal growth of others. When employed to prevent plant growth, for example, in parking areas, highway abutments, and railway yards, etc., the emulsions may be applied by spraying only the surface of said media or they may be mixed with said media. Generally, spraying only the soil surface is sufficient to prevent plant growth in areas which are to be kept clear of plants. However, the emulsions may be incorporated into customarily-employed temporary surfacing materials, e. g., oils, cinders, etc.

While the present herbicidal composition is of interest in that it may be used to totally prevent plant growth when used at high enough concentrations, it demonstrates a selective effect at lower concentrations whereby most narrow-leaf plants are substantially injured and broad-leaf plants are unaffected. The present invention thus provides a means of suppressing or entirely preventing the growth of grasses in fields of crop plants such as cotton, beet, red-clover, cucumber, and mustard. At even lower concentrations there is apparent also a selectivity of effect with respect to the narrow-leaf plants. Thus, at a 25-lb. per acre rate, growth of the narrow-leaf plants (wild oat, cheat grass, rye, buckwheat and corn) is almost entirely prevented, whereas at a 5-lb. per acre rate, growth of cheat grass, rye and buckwheat is entirely prevented but wild oat and corn is not at all affected by application of the hydrazone at this rate.

Remarkable also is the peculiar means by which the growth inhibiting effect of the hydrazone makes itself evident. For example, at concentrations at which growth of the broad-leaf plants is inhibited, there is apparently no effect on the germination of seeds of such plants. At such concentrations the broad-leaf plants emerge and appear to be completely healthy for a period of a week to ten days; however, only the seed leaves are formed and the secondary leaves are never formed, so that the plants eventually collapse and die. At concentrations which prevent the growth of the broad-leaf plants there is at the same time a pre-emergent effect on the smaller grasses such as cheat and rye. These grasses either fail to germinate in soils which have been treated with the hydrazone or if germination occurs there is a failure to penetrate the soil surface.

The invention is further illustrated, but not limited, by the following example:

*Example*

This example shows evaluation of formaldehyde 2,4-dinitrophenylhydrazone as a pre-emergent herbicide. Briefly, the chemical is applied in spray form to soil seeded to representative grasses and broad-leaf plants.

Aluminum pans, 13" x 9" x 2", were filled with a good grade of top soil which had been screened through a 1/4" wire mesh and mixed with sand in a preparation of two parts of the top soil to one part of the sand. The soil surface was then compacted to a depth of 3/8" from the top of the pan. Twenty seeds each of wild oats, cheat grass, rye grass and buckwheat were then scattered randomly over 1/3 of the area of the soil surface and five corn seeds were planted uniformly in this same area. Over the remaining 2/3 of the area, twenty seeds each of the following broad-leaf plants were scattered randomly; mustard, red clover, beet, cotton, and cucumber. The seeds were then covered with soil to the pan top.

The present herbicidal solution was prepared by dissolving 0.4 g. of the 2,4-dinitrophenylhydrazone in 20 cc. of acetone. 10 ml. of this solution was diluted with water to 30 cc. Application of this quantity of the solution to said pans is calculated to correspond to the use of 25 lbs. of the hydrazone per acre. Another solution, calculated to correspond to 10 lbs. of the hydrazone per acre, was prepared by diluting 4 ml. of the acetone solution to 30 cc. Still another treating solution was prepared by diluting 2 ml. of the acetone solution to 30 cc., whereby a concentration of hydrazone corresponding to 5 lbs. per acre was obtained.

The planted pans were then placed in an exhaust hood and sprayed first with 30 cc. of an aqueous solution of a liquid fertilizer and 0.1% solution of octamethyl pyrophosphoramide. The liquid fertilizer was employed to give a uniform nutrition level and the amide was employed to prevent insect injury. Three pans were then respectively sprayed with either the 25 lbs. per acre, the 10 lbs. per acre, or the 5 lbs. per acre solutions of the hydrazone. One of the pans which had been planted and treated with the liquid fertilizer and octamethyl pyrophosphoramide in the same manner was set aside to be used as a "blank." The four pans were then placed in 1/2" of water and allowed to absorb moisture through perforated bottoms until the soil surface was completely moist. The pans were then transferred to a wet sand bench in the greenhouse, and maintained there for ten days under ordinary conditions of sunlight and watering.

Observation of the pans at the end of that time showed that the pan which had been sprayed with the 25 lb. per acre solution of the hydrazone showed complete suppression of wild oats, cheat grass, rye, corn, buckwheat, mustard and cucumber and marked inhibition of red clover and beet. At this rate, however, cotton had emerged and was thriving as well as in the pan which had not been sprayed with the hydrazone, i. e., the "blank" pan. At the 10 lb. per acre rate, there was complete suppression of cheat grass, rye, buckwheat and cucumber and substantial inhibition of mustard, red clover and beet, and no effect on wild oats, corn and cotton. At the five lb. per acre rate, there was complete suppression of cheat grass, rye and buckwheat, whereas corn, wild oats, mustard, red clover, beet, cotton and cucumber thrived. Seeds which had been planted in the pan which had not been sprayed with the hydrazone had emerged and were in excellent condition. Accordingly, when used at the rate of 25 lbs. per acre formaldehyde 2,4-dinitrophenylhydrazone is an unusually effective pre-emergent de-weeder in fields planted to cotton. At 10 lbs. per acre, it is effective in preventing the growth of grasses and a number of broad-leaf plants in fields planted to corn or cotton. At the 5 lbs. per acre, it greatly prevents the growth of grass in fields planted to cotton, corn, cucumber, beets or mustard.

For purposes of comparison, similar testing of the pre-emergent activity of formaldehyde phenylhydrazone instead of the 2,4-dinitrophenylhydrazone was conducted. In no instance was there evidenced a complete suppression of germination and growth of any of the test seeds. Wild oat, cheat grass, rye grass, cotton, and corn thrived as in the "blank" pan. Buckwheat, red clover, beet and cucumber were very slightly inhibited.

What we claim is:

1. The method of preventing plant growth which comprises applying to a medium supporting said growth a pre-emergent herbicidal composition comprising formaldehyde 2,4-dinitrophenylhydrazone as the active ingredient, said hydrazone being present in said composition in a quantity which is toxic to plant life.

2. The method of preventing plant growth which comprises applying to soil normally supporting said growth a pre-emergent herbicidal composition comprising formaldehyde 2,4-dinitrophenylhydrazone as the active ingredient, said hydrazone being present in a quantity which is toxic to said growth.

3. The method of preventing the growth of undesired plants which comprises applying to soil normally supporting said growth a pre-emergent herbicidal composition comprising formaldehyde 2,4-dinitrophenylhydrazone as the toxic ingredient, said hydrazone being present in a quantity which is toxic to said growth.

4. The method of preventing the growth of grasses in fields planted to cotton without adversely affecting the germination and growth of said cotton which comprises applying to soils normally supporting germination and growth of grasses and cotton a composition comprising a uniform dispersion of formaldehyde 2,4-dinitrophenylhydrazone in a mixture with water and an inert organic liquid which is a solvent for said hydrazone, said hydrazone being present in said composition in a quantity which is toxic to plant life.

References Cited in the file of this patent

UNITED STATES PATENTS

| | | |
|---|---|---|
| 2,509,233 | Kaberg et al. | May 30, 1950 |
| 2,703,751 | Sharp | Mar. 8, 1955 |
| 2,758,050 | Hackmann | Aug. 7, 1956 |
| 2,763,539 | McQueen | Sept. 18, 1956 |

OTHER REFERENCES

King: "Agriculture Handbook," No. 69, page 175 (May 1954).

UNITED STATES PATENT OFFICE
CERTIFICATE OF CORRECTION

Patent No. 2,857,259                                                         October 21, 1958

William E. Weesner et al.

It is hereby certified that error appears in the above numbered patent requiring correction and that the said Letters Patent should read as corrected below.

In the grant, lines 1 and 2, for "William E. Weesner, of Dayton, Ohio, and Philip C. Hamm, of Webster Groves, Missouri," read -- William E. Wessner, of Dayton, Ohio, and Philip C. Hamm, of Webster Groves, Missouri, said Hamm assignor to Monsanto Chemical Company, of St. Louis, Missouri, a corporation of Delaware,; line 11, for -- William E. Weesner and Philip C. Hamm, their heirs" read William E. Weesner, his heirs or assigns, and Monsanto Chemical Company, its successors --; in the heading to the printed specification, lines 3 and 4, for "William E. Weesner, Dayton, Ohio, and Philip C. Hamm, Webster Groves, Mo." read -- William E. Weesner, Dayton, Ohio, and Philip C. Hamm, Webster Groves, Mo., said Hamm assignor to Monsanto Chemical Company, St. Louis, Mo., a corporation of Delaware --.

Signed and sealed this 16th day of June 1959.

(SEAL)
Attest:
KARL H. AXLINE

Attesting Officer

ROBERT C. WATSON
Commissioner of Patents